UNITED STATES PATENT OFFICE.

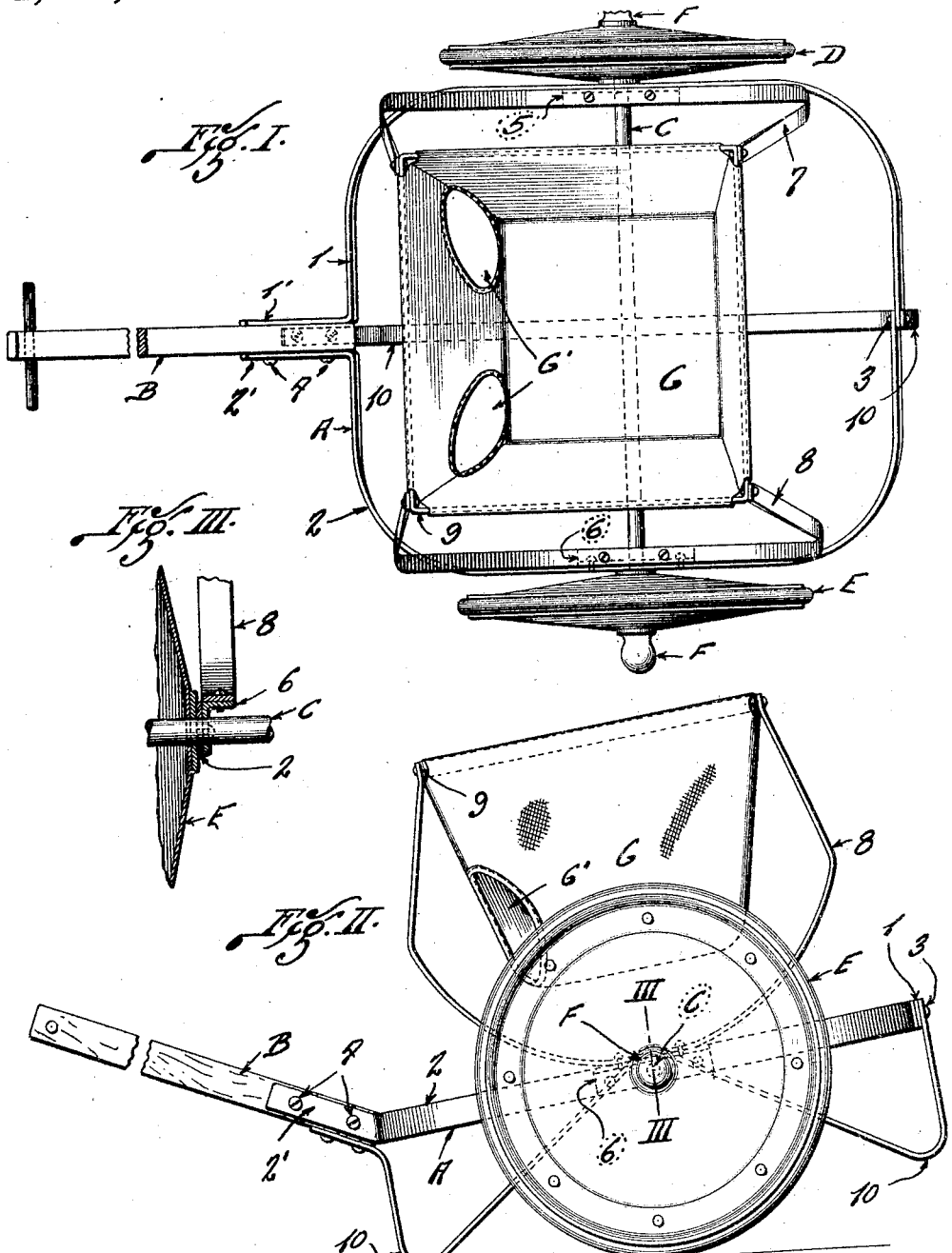

JOHN A. EBERLE, OF ST. LOUIS, MISSOURI.

CHILD'S CART.

1,410,174.     Specification of Letters Patent.     Patented Mar. 21, 1922.

Application filed September 27, 1920. Serial No. 413,079.

*To all whom it may concern:*

Be it known that I, JOHN A. EBERLE, a citizen of the United States of America, and a resident of the city of St. Louis, in the State of Missouri, have invented certain new and useful Improvements in Children's Carts, of which the following is a full, clear, and exact description, reference being had to the accompanying drawings, forming a part of this specification.

My invention relates to a child's cart intended more particularly for the use of infants, the invention having for its object the production of an inexpensive vehicle wherein an infant may be comfortably seated and carried in perfect safety, the seat of said cart being so constructed as to eliminate all possibility of the child falling from the cart and being injured.

Briefly stated, the child's cart herein shown comprises a flexible seat pocket supported by resilient supporting members upon a wheeled frame, said frame being provided with a handle for moving same, and rests to prevent said cart from being tipped to an excessive angle.

With the foregoing and other objects in view, the invention comprises the novel construction, combination and arrangement of parts hereinafter more specifically described and illustrated in the accompanying drawing wherein is shown the preferred embodiment of the invention; however, it is to be understood that the invention comprehends changes, variations and modifications which come within the scope of the claims hereunto appended.

Fig. I is a plan of my improved child's cart.

Fig. II is a side elevation of the cart shown in Fig. I.

Fig. III is a section taken approximately on the line III—III of Fig. II.

In the drawings A designates the cart frame, which is preferably composed of a pair of substantially U-shaped members 1 and 2 secured together in any suitable manner such as a rivet 3 at a point at the rear of said cart frame, and having outwardly projecting extensions 1' and 2' at the forward portion of said frame A to receive a handle B, the said handle being secured to the said extensions 1' and 2' of the frame members 1 and 2 by means of screws 4.

Secured to the frame members 1 and 2 on the inner face thereof are a pair of seat supporting members 5 and 6, each of said seat supporting members being formed of a comparatively short section of angle bar, one leg of which is fixed to one of the frame members 1 and 2 and the other leg extending inwardly therefrom.

An axle C, which passes through openings formed in the frame members 1 and 2 and in the vertical legs of the seat supporting members 5 and 6, is provided at its outer ends with ground wheels D and E rotatably mounted upon said axle. By referring to Fig. I of the drawing it will be noted that the axle C needs no fastening means to secure it to the frame A as the inner face of the ground wheels D and E bear against the frame members 1 and 2 and because the said wheels are held in place on the said axle by means of nuts F there can be no lateral movement of the said axle or wheels.

Fixed to the seat supporting members 5 and 6 are resilient seat suspension members 7 and 8, said seat suspension members having upwardly extending and inwardly inclined portions to which is secured the metal frame member 9 of the pocket seat G. This pocket seat G is preferably made of canvas or fabric of any other suitable description, the walls of which are secured to the frame member 9 by folding the material at the upper margins of the said walls over the frame and stitching the fold, and is provided with a pair of openings G' through which the legs of a child occupying the seat may extend.

To prevent the cart from being tipped to a dangerous angle, I provide a strip of material secured to the frame A at the forward and rear portion of same and having downwadly bent ground contacting portions 10. These ground contacting portions 10 also act as rests when the cart is stationary.

The upper frame 9, from which the fabric seat pocket is suspended, is preferably in the form of a rectangular bar made of metal, so as to securely hold the upper margins of the flexible pocket. Each of the resilient side members 7 and 8 is provided with a bowed lower portion secured to the wheeled frame and converging upper end portions secured to corners of the rectangular upper frame 9. So the fabric seat pocket is securely held by the upper frame 9, and the latter is yieldingly supported by the side members 7 and 8.

The wheeled frame is provided with only two wheels whereby the suspended seat pocket is normally supported, and this pocket lies directly above the axis of the wheels. The two-wheeled frame, is, therefore, approximately balanced when a child is seated in the suspended pocket, although the pocket will be tilted in response to upward and downward movements of the rigidly secured handle.

I claim:

1. A child's cart having a flexible seat pocket provided with leg holes in its front wall, an upper frame secured to the upper margins of said flexible seat pocket, said pocket being suspended from said upper frame, a wheeled frame below said upper frame, bowed inwardly inclined side members secured to said wheeled frame and having their upper ends secured to said upper frame, and a handle for moving said wheeled frame.

2. A child's cart having a flexible seat pocket provided with leg holes in its front wall, an upper frame secured to the upper margins of said flexible seat pocket, said pocket being suspended from said upper frame, a wheeled frame below said upper frame, resilient inwardly inclined side members each having a bowed lower portion secured to said wheeled frame and converging upper end portions secured to said upper frame, and a handle for moving said wheeled frame.

3. A child's cart having a flexible seat pocket, a frame to which said seat pocket is secured, a cart frame supporting said seat pocket, said cart frame comprising a pair of substantially U-shaped members secured together, seat supporting members angular in cross section secured to said U-shaped members, said seat supporting members and said U-shaped members being provided with registering openings, an axle supported in said openings, wheels mounted upon the said axle at the outer ends thereof, and a handle secured to said U-shaped members whereby said cart is moved.

4. A child's cart having a flexible seat pocket, a frame to which said seat pocket is secured, a cart frame supporting said seat pocket, said cart frame comprising a pair of substantially U-shaped members secured together, comparatively short seat supporting members comprising angle iron secured to said U-shaped members, one leg of each of said seat supporting members and said U-shaped members being provided with registering openings, an axle supported in said openings, wheels mounted upon the said axle at the outer ends thereof, rests carried by said cart frame, and a handle secured to said cart frame whereby said cart is moved.

5. A child's cart having a flexible seat pocket, an upper frame secured to the upper margins of said flexible seat pocket, said pocket being suspended from said upper frame, a wheeled frame below said upper frame, resilient side members each having a bowed lower portion secured at the middle to said wheeled frame and diverging upwardly from said wheeled frame, each of said resilient side members also having upper end portions converging upwardly from said bowed middle portion to said upper frame, said upper end portions being separated from each other and secured at their upper ends to said upper frame.

6. A child's cart having a flexible seat pocket, an upper frame secured to the upper margins of said flexible seat pocket, said pocket being suspended from said upper frame, a wheeled frame below said upper frame, resilient side members each having a bowed lower portion secured at the middle to said wheeled frame and diverging upwardly from said wheeled frame, each of said resilient side members also having upper end portions converging upwardly from said bowed middle portion to said upper frame, said upper end portions being separated from each other and secured at their upper ends to said upper frame, and the upper portions of each of said resilient side members being inclined inwardly toward the other resilient side member.

7. A child's cart having a flexible seat pocket with leg holes in its front wall, an upper frame secured to the upper margins of said flexible seat pocket, said pocket being suspended from said upper frame, a wheeled frame below said upper frame, resilient side members each having a bowed lower portion rigidly secured at the middle to said wheeled frame, and diverging upwardly from said wheeled frame, each of said resilient side members also having upper end portions formed integral with and converging upwardly from said bowed middle portion to said upper frame, said upper end portions being separated from each other and secured at their upper ends to said upper frame.

In testimony that I claim the foregoing I hereunto affix my signature.

JOHN A. EBERLE.